United States Patent
Pan

(10) Patent No.: US 11,651,045 B2
(45) Date of Patent: May 16, 2023

(54) METHOD, APPARATUS, AND DEVICE FOR DISPLAYING, SENDING, AND RECEIVING RELEVANT INFORMATION OF ELECTRICAL RED PACKET

(71) Applicant: Alipay (Hangzhou) Information Technology Co., Ltd., Zhejiang (CN)

(72) Inventor: Hai Pan, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 41 days.

(21) Appl. No.: 17/352,984

(22) Filed: Jun. 21, 2021

(65) Prior Publication Data

US 2022/0019636 A1 Jan. 20, 2022

(30) Foreign Application Priority Data

Jul. 15, 2020 (CN) .......................... 202010680763.0

(51) Int. Cl.
| | | |
|---|---|---|
| *G06F 16/9535* | (2019.01) | |
| *G06F 16/9538* | (2019.01) | |
| *G06F 3/04847* | (2022.01) | |
| *G06F 3/04842* | (2022.01) | |
| *G06Q 20/06* | (2012.01) | |
| *G06F 3/0485* | (2022.01) | |

(52) U.S. Cl.
CPC ...... *G06F 16/9535* (2019.01); *G06F 3/04842* (2013.01); *G06F 3/04847* (2013.01); *G06F 16/9538* (2019.01); *G06F 3/0485* (2013.01); *G06Q 20/065* (2013.01)

(58) Field of Classification Search
None
See application file for complete search history.

(56) References Cited

U.S. PATENT DOCUMENTS

| | | | |
|---|---|---|---|
| 6,609,106 B1 * | 8/2003 | Robertson | G06Q 30/0236 705/26.8 |
| 2008/0189188 A1 * | 8/2008 | Morgenstern | G06Q 50/01 705/26.8 |
| 2008/0189189 A1 * | 8/2008 | Morgenstern | G06Q 30/0643 705/27.2 |

(Continued)

FOREIGN PATENT DOCUMENTS

| | | | | |
|---|---|---|---|---|
| CN | 106327164 A | | 1/2017 | |
| CN | 106656747 A | * | 5/2017 | ........... G06Q 20/065 |

(Continued)

OTHER PUBLICATIONS

Machine translation of CN106656747A, retrieved Oct. 20, 2021 from https://worldwide.espacenet.com/.*

*Primary Examiner* — Linda Huynh

(74) *Attorney, Agent, or Firm* — Finnegan, Henderson, Farabow, Garrett & Dunner, LLP

(57) ABSTRACT

A method for displaying relevant information of an electrical red packet includes: acquiring a browsing operation of a user on a target page; determining, in response to the browsing operation, at least one associated account of an account of the user; searching for relevant information of an electrical red packet that the at least one associated account participated in before a triggering time point of the browsing operation; and displaying the relevant information on the target page.

19 Claims, 10 Drawing Sheets

(56) References Cited

U.S. PATENT DOCUMENTS

| | | | | |
|---|---|---|---|---|
| 2009/0055292 | A1* | 2/2009 | Chong | G06Q 30/02 |
| | | | | 705/27.2 |
| 2013/0332307 | A1* | 12/2013 | Linden | G06Q 50/01 |
| | | | | 705/26.7 |
| 2017/0178094 | A1* | 6/2017 | Yu | H04L 51/046 |
| 2017/0289634 | A1* | 10/2017 | E | H04N 21/4532 |
| 2017/0346927 | A1* | 11/2017 | Yu | H04L 51/224 |
| 2018/0020490 | A1* | 1/2018 | Chong | H04L 12/185 |
| 2018/0295208 | A1* | 10/2018 | Li | H04L 67/306 |
| 2018/0331985 | A1* | 11/2018 | Lai | G06Q 30/0207 |
| 2019/0166394 | A1* | 5/2019 | Lin | H04N 21/47217 |
| 2019/0238488 | A1* | 8/2019 | Peng | G06Q 20/0655 |

FOREIGN PATENT DOCUMENTS

| | | | | |
|---|---|---|---|---|
| CN | 108229939 A | 6/2018 | | |
| CN | 109150832 A | 1/2019 | | |
| CN | 109685538 A | 4/2019 | | |
| WO | WO-2017114207 A1 * | 7/2017 | | G06Q 20/06 |

\* cited by examiner

TO: [____] + Select a friend

Please enter confession content here

Record a confession

Enter an amount

From: Select to be anonymously 2020. 05. 20

Stuff in the red packet

FIG. 5

METHOD, APPARATUS, AND DEVICE FOR DISPLAYING, SENDING, AND RECEIVING RELEVANT INFORMATION OF ELECTRICAL RED PACKET

CROSS-REFERENCE TO RELATED APPLICATIONS

The present application is based upon and claims priority to Chinese Patent Application No. 202010680763.0, filed on Jul. 15, 2020, the entire content of which is incorporated herein by reference.

TECHNICAL FIELD

The present application relates to the field of information science technologies, and in particular, to a method, an apparatus, and a device for displaying, sending, and receiving relevant information of an electrical red packet.

BACKGROUND

Technologies related to electrical red packets are now more popular. Whenever there are holidays or other reasons, users can exchange funds by sending electrical red packets.

However, a sending process of the electrical red packet in the prior art is only carried out between two users. If a user needs to inform a third party of relevant information of the electrical red packet, relatively cumbersome operations are usually required. These operations may specifically include taking a screenshot of the relevant information and sending it to a third party, and so on.

Therefore, it is necessary to provide a method for displaying relevant information of an electrical red packet in order to simplify steps of informing a third party of the relevant information.

SUMMARY

According to a first aspect of embodiments of the present specification, a method for displaying relevant information of an electrical red packet includes: acquiring a browsing operation of a user on a target page; determining, in response to the browsing operation, at least one associated account of an account of the user; searching for relevant information of an electrical red packet that the at least one associated account participated in before a triggering time point of the browsing operation; and displaying the relevant information on the target page.

According to a second aspect of embodiments of the present specification, a method for sending relevant information of an electrical red packet includes: acquiring, by a terminal, relevant information entered by a user on a sending interface of an electrical red packet; acquiring a sending operation on the electrical red packet; and sending the relevant information to a target device based on the sending operation, wherein the relevant information is stored on the target device and displayed by the method according to the first aspect.

According to a third aspect of embodiments of the present specification, a method for receiving relevant information of an electrical red packet includes: acquiring, by a terminal, an opening operation entered by a user on a receiving interface of an electrical red packet; acquiring relevant information of the electrical red packet; and sending the relevant information to a target device, wherein the relevant information is stored on the target device and displayed by the method according to the first aspect.

According to a fourth aspect of embodiments of the present specification, a device for displaying relevant information of an electrical red packet includes: a processor; and a memory storing instructions executable by the processor, wherein the processor is configured to: acquire a browsing operation of a user on a target page; determine, in response to the browsing operation, at least one associated account of an account of the user; search for relevant information of an electrical red packet that the at least one associated account participated in before a triggering time point of the browsing operation; and display the relevant information on the target page.

According to a fifth aspect of embodiments of the present specification, a device for sending relevant information of an electrical red packet includes: a processor; and a memory storing instructions executable by the processor, wherein the processor is configured to: acquire relevant information entered by a user on a sending interface of an electrical red packet; acquire a sending operation on the electrical red packet; and send the relevant information to a target device based on the sending operation, wherein the relevant information is stored on the target device and displayed by the method according to the first aspect.

According to a sixth aspect of embodiments of the present specification, a device for receiving relevant information of an electrical red packet includes: acquire an opening operation entered by a user on a receiving interface of an electrical red packet; acquire relevant information of the electrical red packet; and send the relevant information to a target device, wherein the relevant information is stored on the target device and displayed by the method according to the first aspect.

According to a seventh aspect of embodiments of the present specification, a non-transitory computer-readable medium stores computer-readable instructions thereon, wherein the computer-readable instructions are executable by a processor to implement the methods for displaying, sending, and receiving an electrical red packet.

Embodiments of the present specification can achieve the following beneficial effects: by acquiring a browsing operation of a user on a target page, at least one associated account of an account of the user is determined in response to the browsing operation; relevant information of an electrical red packet that the at least one associated account participated in before a triggering time point of the browsing operation is searched for; and the relevant information is displayed on the target page. A target page is provided to directly display relevant information of an electrical red packet to a third party for browsing. There is no need to take a screenshot of the relevant information and save it and then send it to the third party, thus simplifying steps of informing the third party of the relevant information.

BRIEF DESCRIPTION OF THE DRAWINGS

The accompanying drawings, which are incorporated in and constitute a part of this specification, illustrate embodiments and, together with the description, serve to explain the principles of the specification.

FIG. 5 is a schematic diagram of an interface of a sending page in a method for sending relevant information of an electrical red packet according to an embodiment.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The described embodiments are only examples rather than all embodiments consistent with the present specification.

In the prior art, a process of sending and displaying an electrical red packet is only carried out between two users. If one of the users wants to inform a third party of relevant information of the electrical red packet, relatively cumbersome steps are often required. Taking an instant messaging application as an example, during Valentine's Day, many couples or partners will send red packets to each other, and if they want to share relevant information about the sent/received red packets to a sharing application, such as Moments, or to other users, these users need to take screenshots of pages of sending/receiving red packets, and then share them with other persons or publish them to Moments in the form of pictures. The process is usually cumbersome. Moreover, the existing red packets have a single function and cannot meet the needs of users.

In view of the above, embodiments of the present specification provide a method for displaying relevant information of an electrical red packet, builds application scenarios of electrical red packets, and uses red packets as a continuation of C2C (Consumer to Consumer) social relationships between users to solve deep-level expression needs of users. In addition to carrying the amount of money, an electrical red packet also carries a user's blessings, wishes, confession, or other emotional appeals. When a user sends a red packet, the user will attach his/her own emotional appeal on the red packet and send it to the other party together. Moreover, while sending or receiving, an electrical red packet carrying relevant information can also be published to a target page (such as a confession wall and a wish wall) for other users to browse, like, or comment. The current red packet function is upgraded and an application function of electrical red packet is enriched, thereby increasing the utilization rate of red packet users and strengthening user relationship.

Figure 1:
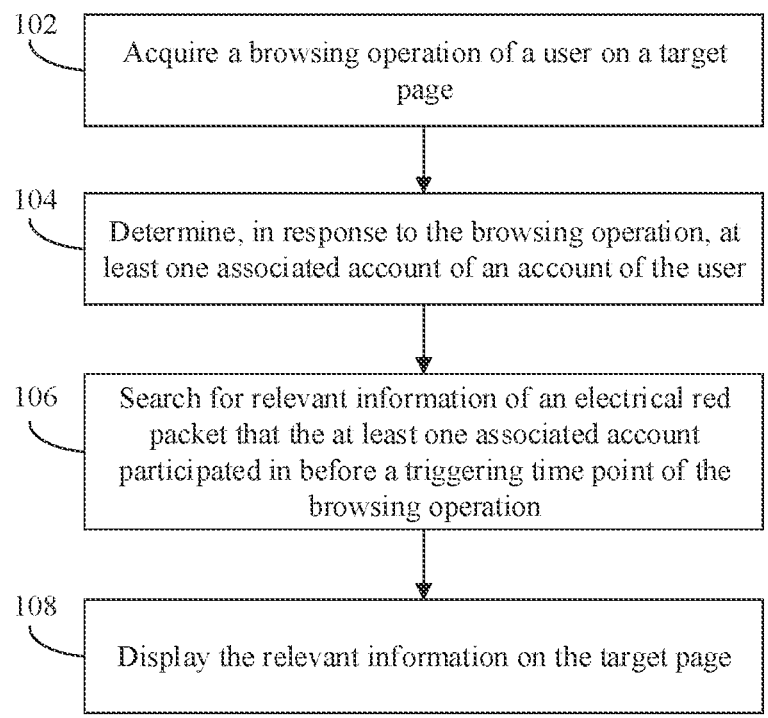
FIG. 1 is a flowchart of a method for displaying relevant information of an electrical red packet according to an embodiment.

FIG. 1 is a flowchart of a method for displaying relevant information of an electrical red packet according to an embodiment. For example, the method may be implemented as a program or an application client loaded on an application server. Also for example, the method may be performed by a server. The server may be a single device or a system composed of multiple devices (for example, a distributed server). As shown in FIG. 1, the method may include the following steps.

In step 102, a browsing operation of a user on a target page is acquired.

In an embodiment, the user may be a third-party user. For example, user A sends a red packet to user B and publishes relevant information of the red packet to a target page. At this time, the third-party user may be another user other than user A and user B.

In an embodiment, an account of the user may be an instant messaging (IM) account, a blog account, a trading platform registered account, and so on. The specific type of the account of the user is not limited in the present application, as long as the account is an account that can be used for social activities, such as an instant messaging account, a blog account, and a trading application account.

In an embodiment, the target page may be a web page for displaying the relevant information. In the present embodiment, if it involves sending a confession red packet, the target page may be a page capable of displaying relevant information about the confession red packet, and the target page may be referred to as a theme wall (such as a confession wall and a wishing wall). A user may post relevant information about a confession red packet sent to another person on the confession wall, and may also post relevant information about a received confession red packet on the confession wall. Friends of the user or other users who follow the user can see the relevant information of the red packet published by the user on the confession wall.

In step 104, at least one associated account of the account of the user is determined in response to the browsing operation.

In an embodiment, the associated account may at least include: an account of a user having a friend relationship with the current user, an account of a user followed by the current user, or an account of a user customized by the current user, etc.

When acquiring a browsing operation of the user on a target page, in response to the browsing operation of the user, a server determines an account of another user associated with the user. For example, the server receives an operation of user C browsing the confession wall, and may determine at least one account associated with the account of user C.

In step 106, relevant information of an electrical red packet that the at least one associated account participated in before a triggering time point of the browsing operation is searched for.

In the embodiments, an electrical red packet is a mode of distributing red packets through Internet online activities, which can distribute red packets in combination with third-party payment tools. The electrical red packet in the present embodiment may be a confession red packet. It may also be a transfer behavior between two users, and the third-party user may be a settlement institution or a bank.

After determining at least one associated account, the server may judge if at least one associated account has participated in sending or receiving of an electrical red packet before a triggering time point of the browsing operation. If the at least one associated account has participated in a relevant operation of an electrical red packet, it may be further determined whether the associated account serves as a sender or recipient of the electrical red packet, and relevant information of the associated account sending or receiving the electrical red packet may be determined.

When the relevant information of the electrical red packet is displayed on a target page, one of more pieces of information such as an expression form of the electrical red packet, information content of the electrical red packet, account information of the sender/receiver of the electrical red packet, a location address of the electrical red packet, and specific amount of the electrical red packet may be displayed. The expression form of the electrical red packet may be set according to actual application requirements, for example, the electrical red packet is set to a pattern of an envelope or a paper red packet. The information content of the electrical red packet may include text content, picture content, video content, audio content, or the like. The account information of the sender/receiver of the electrical red packet may include an account nickname, an account avatar, an account ID, and the like. The location address of the electrical red packet may be specific to a city, a specific location in the city, or the like, and may be specifically selected and set according to actual conditions, which is not limited in the present embodiment.

In step 108, the relevant information is displayed on the target page.

Taking a confession red packet as an example, the relevant information of the confession red packet may be displayed on a confession wall.

Taking money-transfer information as an example, the money-transfer information is displayed on a corresponding display screen of a monitoring system.

During display, all content of the relevant information may be displayed on the target page. In some embodiments, only a thumbnail of the relevant information may be displayed, and the thumbnail may only include part of content of the relevant information. The form of the thumbnail may be a text and/or picture. For example, relevant information of a confession red packet displayed on the confession wall only includes confession text of the electrical red packet and avatars of the sender and/or receiver of the electrical red packet. By displaying the relevant information of the electrical red packet in the form of a thumbnail, it can not only ensure that the electrical red packet can be displayed on the confession wall for third-party users to browse, but also not over-expose users' privacy, and can control space occupied by the relevant information.

In the method illustrated in FIG. 1, a browsing operation of a user on a target page is acquired, at least one associated account of an account of the user is determined in response to the browsing operation, relevant information of an electrical red packet that the at least one associated account participated in before a triggering time point of the browsing operation is searched for, and the relevant information is displayed on the target page. A target page is provided to directly display relevant information of an electrical red packet to a third party for browsing. There is no need to take a screenshot of the relevant information and save it and then send it to the third party, thus simplifying steps of informing the third party of the relevant information.

In an embodiment, the acquiring a browsing operation of a user on a target page may include: acquiring a click operation of the user on a redirection link on a non-target page, wherein a link destination address of the redirection link is the target page; or acquiring a refreshing operation of the user on the target page. The browsing operation may be an operation of the user clicking on a link to enter the target page, or an operation of the user clicking, swiping, and the like on the target page.

For example, a server acquiring the browsing operation of the user on the target page may be the server acquiring a clicking operation of the user on a redirection link on a non-target page. The user clicks on the redirection link on the non-target page to enter the target page. In addition, the server acquiring the browsing operation of the user on the target page may also be a relevant operation performed by the user on the target page, which may include a refreshing operation of a pull-down page, a click operation or a swiping operation on the target page, and the like.

In an embodiment, the determining an associated account of an account of the user may include: determining, from accounts other than the account of the user, an account that has a friend relationship with the account of the user; or determining an account set as a following relationship in a relationship list of the account of the user.

In the embodiment, in an instant messaging application, the account that has a friend relationship with the account of the user may be an account existing in a friend list of the user. The associated account may also be a user set as following, for example, an associated account of user C may be an account of user A and an account of user B in a friend list of user C. It may also be an account of user D which sets user C as a following user. In addition, in a blog application, it may be chosen that the relevant information of the confession red packet posted by the user on the confession wall may also be browsed by all users who use the same blog application. For example, the relevant information of the confession red packet posted by user A of a blog application on the confession wall may be made public so that all users who use the blog application have permission to browse.

In an embodiment, the searching for relevant information of an electrical red packet that the associated account participated in before a triggering time point of the browsing operation may include: searching for relevant information of an electrical red packet that the associated account participated in as a sender before a triggering time point of the browsing operation; or searching for relevant information of an electrical red packet that the associated account participated in as a recipient before a triggering time point of the browsing operation; or searching for relevant information of an electrical red packet that the associated account participated in as a sender before a triggering time point of the browsing operation and searching for relevant information of an electrical red packet that the associated account participated in as a recipient before the triggering time point of the browsing operation.

After the associated account of the user is determined, relevant information of the electrical red packet that the associated account participated in as the recipient and/or sender before the browsing operation is triggered may be further determined. For example, after acquiring the browsing operation of user C on the target page, it is determined that associated accounts of user C are account A and account B, and that account A publishes relevant information a of a confession red packet sent by user A to account B before the browsing operation of user C is triggered, and publishes relevant information b of a confession red packet that user A received as the recipient. At this time, both relevant information a and relevant information b may be displayed on a confession wall.

In an embodiment, when relevant information is displayed on the target page, the following methods may be used for display:

Method 1: Displaying according to generation time of the relevant information. For example, the displaying the relevant information on the target page may include: determining a generation time of the relevant information; and displaying the relevant information on the target page in an inverse chronological order of the generation time.

In the embodiment, when displaying relevant information, the relevant information may be sorted according to the generation time, and the relevant information may be displayed sequentially on the target page in an inverse chronological order. For example, the relevant information includes information a, information b, and information c. The generation time of information a is 8:00, Mar. 1, 2020, the generation time of information b is 10:00, Mar. 1, 2020, and the generation time of information c is 14:00, Mar. 1, 2020. According to the generation time, information c is displayed as a first item on the current target page, information b is displayed as a second item on the current target page, and information a is displayed as a third item in the current target page.

By means of the above method 1, relevant information of the latest electrical red packet may be displayed for a user, so that the user can browse the latest relevant information every time the user refreshes the browsing target page.

Method 2: Displaying according to a distance between a poster who posted the relevant information and a user. For example, the displaying the relevant information on the target page may include: determining positioning information of each poster of the relevant information; determining, according to positioning information of each poster, distance information between each poster and the user; and displaying the relevant information on the target page in an order of the distance information from near to far.

In the embodiment, the poster may include the sender or recipient of the relevant information. When determining the positioning information of each poster of the relevant information, it may be determined according to address information selected by the poster when posting the relevant information, or positioning information of each poster determined by a server by means of various positioning methods.

For example, a third-party user is user D, and the relevant information includes: information a posted by user A, information b posted by user B, and information c posted by user C. It is determined that address information of user A is obtained as address x, address information of user B is obtained as address y, and address information of user C is obtained as address z. It is obtained by calculation that a distance between user A and user D is 50 m, a distance between user B and user D is 500 m, and a distance between user C and user D is 1 km. At this time, information a may be displayed as a first item on the current target page, and information b may be displayed as a second item on the current target page, and information c is displayed as a third item on the current target page.

By means of the above method 2, relevant information of an electrical red packet posted by near users may be displayed in priority for a user, so that the user can browse the latest relevant information every time the user refreshes the browsing target page.

Method 3: Displaying the relevant information according to the number of views, the number of comments, or the number of likes. For example, the displaying the relevant information on the target page may include: determining an exposure of each piece of relevant information, where the exposure includes one or more of the number of searches, the number of views, the number of comments, or the number of likes; and displaying the relevant information on the target page in an order of exposures from most to least.

In the embodiment, the exposure may only be calculated from one of the number of searches, the number of views, the number of comments, or the number of likes, or may be a final exposure calculated by integrating the number of searches, the number of views, the number of comments, or the number of likes. A greater exposure indicates a higher popularity of relevant information. Relevant information with a high popularity is displayed in priority.

By means of the above method 3, relevant information with a high popularity may be displayed in priority for a user, so that the user can browse the hottest relevant information every time the user refreshes the browsing target page.

Method 4: Displaying according to customized settings of the user. The user may customize the settings to prioritize display of relevant information of an electrical red packet posted by the user. For example, the displaying the relevant information on the target page may include: determining relevant information of an electrical red packet that the user participated in as a sender and/or a recipient before a triggering time point of the browsing operation; and displaying the relevant information on the target page in priority.

In the embodiment, when displaying the relevant information, the relevant information of the electrical red packets posted by the user may be displayed in priority. For example, the relevant information of the electrical red packet posted by the user himself/herself is displayed on the top, and relevant information of the electrical red packet of the associated account is then displayed.

The customized settings of the user may be set according to the actual situation, and when displayed, information may be displayed according to the customized settings. In addition, when the relevant information of the electrical red packet posted by the user himself/herself is displayed in priority, the display may be performed according to any of the above methods 1 to 3.

By means of the above method 4, the relevant information may be displayed for the user according to the customized settings of the user, so as to meet browsing needs of the user.

In the above embodiments, the information content of the electrical red packet in the relevant information may also include: multimedia information entered by the sender of the electrical red packet on the sending interface of the electrical red packet when sending the electrical red packet. The multimedia information may include: one or more of text information, picture information, audio information, and video information.

In an embodiment, before displaying the relevant information on the target page, the method may further include: for one piece of relevant information, acquiring setting information of the one piece of relevant information for an associated account corresponding to the one piece of relevant information, where the setting information is configured to indicate an account allowed to view the one piece of relevant information; and judging if the account of the user is an account allowed to view the one piece of relevant information to obtain a first judgment result. Accordingly, the displaying the relevant information on the target page includes: displaying the one piece of relevant information on the target page if the first judgment result indicates that the account of the user is the account allowed to view the one piece of relevant information; and not displaying the one piece of relevant information on the target page if the first judgment result indicates that the account of the user is not the account allowed to view the one piece of relevant information.

In the embodiment, when a user posts relevant information of an electrical red packet to a target page, users allowed to view may be set, for example, "Share with," "Just me," "Don't share," or "All contacts." When the browsing operation of the user on the target page is acquired, it is determined whether the account of the user is an account allowed to view relevant information, if yes, the relevant information is displayed on the target page for the third-party user to view; otherwise, the relevant information is not displayed on the target page. For example, before a server acquires a browsing operation of third-party user C on the target page, there is relevant information a posted by user A and relevant information b posted by user B. When user A posts relevant information a, it is set to be shared with users other than user C, and when user B posts relevant information b, it is set to be shared with all contacts. At this time, when the server acquires the browsing operation of user C on the target page, only relevant information b is displayed on the target page.

By means of the above method, a user who posts relevant information of an electrical red packet can set users who can view the relevant information of the electrical red packet posted on the target page.

Figure 2:
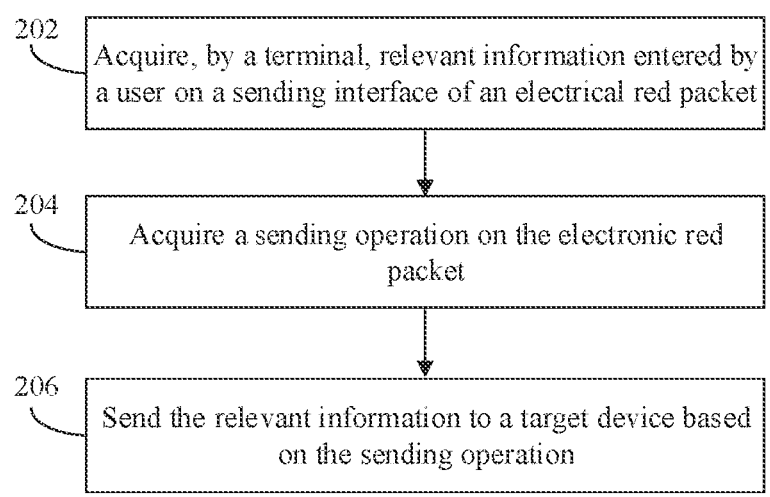
FIG. 2 is a flowchart of a method for sending relevant information of an electrical red packet according to an embodiment.

FIG. 2 is a flowchart of a method for sending relevant information of an electrical red packet according to an embodiment. For example, the method may be implemented as a program or an application client loaded on an application server. Also for example, the method may be performed by a terminal of an information sender. The terminal may be a device such as a mobile phone, a tablet computer, or a personal computer. As shown in FIG. 2, the method may include the following steps:

In step 202, a terminal acquires relevant information entered by a user on a sending interface of an electrical red packet.

For example, the user may be a user who sends the electrical red packet, that is, a sender of the electrical red packet. The relevant information has the same meaning as the relevant information described above in connection with FIG. 1. When sending the relevant information of the electrical red packet, the user can enter the relevant information on the sending interface of the electrical red packet. For example, the user sends a confession red packet. At this time, the relevant information entered by the user may be a love letter text, a confession video, a confession audio, or the like.

In step 204, a sending operation on the electrical red packet is acquired.

For example, the user may complete the sending operation of the electrical red packet by means of a button such as "Send" or "Post" on the sending interface.

In step 206, the relevant information is sent to a target device based on the sending operation, where the relevant information stored on the target device may be displayed by the method described above in connection with FIG. 1.

For example, after the user completes the sending operation of the relevant information, the relevant information may be sent to the target device for storage, and when a display instruction is received, the stored relevant information is displayed on a target page. The target device may be the server in described above in connection with FIG. 1, or may be a designated database, which is not specifically limited in the present embodiment.

By means of the above method, a terminal of a sender acquires relevant information entered by a user on a sending interface of an electrical red packet, acquires a sending operation on the electrical red packet, and sends the relevant information to a target device based on the sending operation. When a display instruction is received, the stored relevant information is displayed on a target page for third-party users to browse. There is no need to take a screenshot of relevant information, save it, and then send it to the third party. A target page is provided to directly display relevant information of an electrical red packet to a third party for browsing, which simplifies steps of informing the third party of the relevant information.

In an embodiment, the acquiring relevant information entered by a user on a sending interface of the electrical red packet may include: acquiring multimedia information entered by the user on the sending interface of the electrical red packet, wherein the multimedia information includes one or more of text information, picture information, audio information, and video information.

In an embodiment, before the sending the relevant information to a target device, the method may further include: acquiring a first setting operation by the user on the relevant information, where the first setting operation is used to set an account allowed to view the relevant information, or the setting operation is used to set an account not allowed to view the relevant information, similar to the above description in connection with FIG. 1.

In an embodiment, the acquiring a first setting operation by the user on the relevant information may include: acquiring a selection operation of the user on an associated network communication user of the user. The associated network communication user may be an instant messaging user, a blog communication user, a registered user of a trading platform, and so on.

For example, when performing the first setting operation on relevant information, the set user object may be set according to an actual application scenario. In the instant messaging application, a selection operation of the user on associated network communication users of the user may be setting users in a friend list, for example, which users in the friend list are allowed to browse the relevant information. In the blog communication, the selection operation of the user for associated network communication users of the user may be setting users in a follower list, for example, which users among the follower users are allowed to browse the relevant information, or all users who use the same associated network communication application are allowed to browse the relevant information.

In an embodiment, after the acquiring a sending operation on the electrical red packet, the method may further include: displaying prompt information if the relevant information entered by the user on the sending interface of the electrical red packet is empty, where the prompt information is used to prompt the user to enter information on the sending interface.

Taking display of relevant information of a confession red packet as an example, the confession red packet carries the user's blessings, wishes, confession, and other emotional appeals. When the user sends a confession red packet to the other party, the relevant information will be attached and sent to the other party. The relevant information may be a paragraph, an image-text, a video, a voice, or the like. The relevant information needs to be entered by the user on a sending interface. When it is acquired that the user clicks the "Send" button without entering relevant information on the sending interface, corresponding prompt information may be displayed to prompt the user to enter confession information that he/she wants to send to the other party on the sending interface, for example, "You have not entered the confession information yet, please enter" is displayed on the sending interface. If the sender wants to send the red packet directly without entering any information, he/she may also click on a relevant button such as "Don't enter, continue sending."

In this implementation process, an application scenario of sending a confession red packet or a blessing red packet is taken as an example. A terminal/server can identify whether information entered by the user on an entering interface meets scenario requirements, and if not, a user is prompted to re-enter. For example, in the scenario of sending a confession red packet, semantic analysis may be performed on the relevant information entered by the user, and the relevant information is considered to meet conditions only when it is obtained through analysis that the entered relevant information has a confession meaning.

In an embodiment, after the sender sends a confession red packet to the recipient, the recipient may return corresponding reply information to the sender after opening the red packet and accept the red packet amount. The server or terminal may perform semantic analysis on the information replied by the recipient to determine if the recipient has the willingness to accept the confession. If the recipient is determined to accept the confession from the sender by identification, blessing information may be sent to the sender and the recipient. For example, it may be implemented by means of the following steps: after the acquiring the relevant information of the electrical red packet, acquiring reply information entered by a user on an opening interface of the electrical red packet; performing semantic analysis on the reply information to determine whether the user accepts the confession of the sender of the electrical red packet; sending, when the user accepts the confession of the sender of the electrical red packet, blessing information to a terminal where the sender is located and a terminal where the user is located; and sending, when the user does not accept the confession of the sender of the electrical red packet, comfort information to the terminal where the sender is located and the terminal where the user is located, or not sending information to the terminal where the sender is located and the terminal where the user is located.

In an embodiment, when the reply information is not text information (such as video, audio, and picture), the reply information is parsed, text information in the reply information is extracted, and then semantic analysis is performed.

In an embodiment, after the sending blessing information to a terminal where the sender is located and a terminal where the user is located, the method may further include: recording a time when the sender of the electrical red packet successfully confessed; and regularly sending blessing information to the sender and recipient according to a preset time period.

In an embodiment, after the sending blessing information to a terminal where the sender is located and a terminal where the user is located, the method may further include: generating a record page for the sender and the recipient, where all the electrical red packets sent between the sender and the recipient are recorded in the record page, and are sorted in a chronological order.

By means of the above method, the role of the electrical red packet is fully brought into play, the manifestation of the electrical red packet is enriched, and the application functions of the electrical red packet are upgraded to increase the utilization rate of the red packet users.

In an embodiment, before the sending the relevant information to a target device, the method may further include: acquiring a second setting operation of the user on the relevant information, where the second setting operation is used to set the relevant information to be displayed on a public display page.

Before the sending the relevant information to a target device, the method may further include: acquiring a third setting operation of the user on the relevant information, where the third setting operation is used to set the relevant information to be anonymously displayed on a public display page.

When the relevant information is set to be displayed on the public display page, in order to protect user privacy information of a poster who posts the relevant information, only the relevant information of the electrical red packet and address information of the poster may be displayed, and an account ID and a user nickname of the poster are not displayed. If an account avatar of the poster is the user's own photo, the account avatar of the poster may not be displayed.

By means of the above method, it may not only ensure that the relevant information can be browsed by more third parties, but also protect the privacy of the poster from being leaked.

Figure 3:
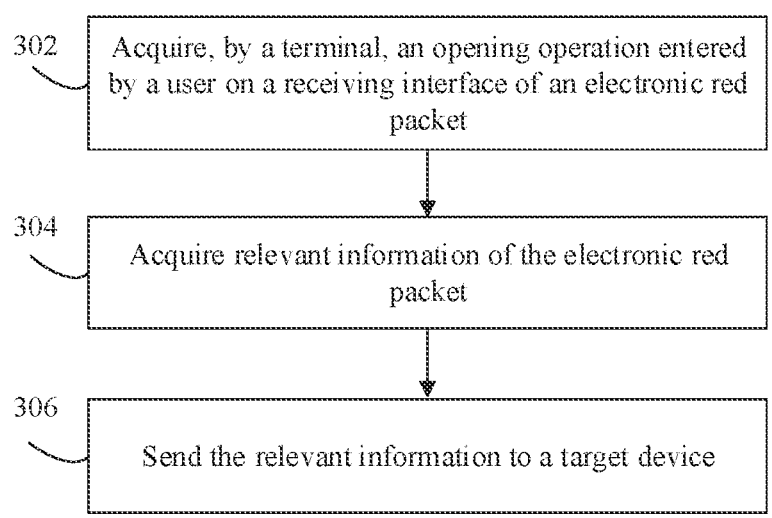
FIG. 3 is a flowchart of a method for receiving relevant information of an electrical red packet according to an embodiment.

FIG. 3 is a flowchart of a method for receiving relevant information of an electrical red packet according to an embodiment. For example, the method may be implemented as a program or an application client loaded on an application server. Also for example, the method may be performed by a terminal of a recipient of the electrical red packet. The terminal may be a device such as a mobile phone, a tablet computer, or a personal computer. As shown in FIG. 3, the process may include the following steps:

In step 302, a terminal acquires an opening operation entered by a user on a receiving interface of the electrical red packet.

For example, the user may be a user who receives the electrical red packet, that is, the recipient of the electrical red packet. After receiving the electrical red packet, the recipient may click the red packet on the receiving interface to complete the opening operation.

In step 304, relevant information of the electrical red packet is acquired.

For example, the relevant information of the electrical red packet in this step has the same meaning as the relevant information described above in connection with FIGS. 1 and 2.

In step 306, the relevant information is sent to a target device, where the relevant information stored on the target device may be displayed by the method described above in connection with FIG. 1.

For example, the target device in this step has the same meaning as the target device described above in connection with FIG. 2.

By means of the above method, after receiving the electrical red packet, the recipient may store the relevant information of the electrical red packet in the target device while opening the electrical red packet. When receiving a display instruction, the relevant information may be posted and displayed on the target page for third-party users to browse. There is no need to take a screenshot of relevant information, save it, and then send it to the third party. A target page is provided to directly display relevant information of an electrical red packet to a third party for browsing, which simplifies steps of informing the third party of the relevant information.

In an embodiment, the relevant information is multimedia information, and the multimedia information may include one or more of text information and picture information.

In an embodiment, before the sending the relevant information to a target device, the method may further include: acquiring a first setting operation by the user on the relevant information, where the first setting operation is used to set an account allowed to view the relevant information, or the setting operation is used to set an account not allowed to view the relevant information.

In an embodiment, before the sending the relevant information to a target device, the method may further include: acquiring a second setting operation of the user on the relevant information, where the second setting operation is used to set the relevant information to be displayed on a public display page.

In an embodiment, before the sending the relevant information to a target device, the method may further include: acquiring a third setting operation of the user on the relevant information, where the third setting operation is used to set the relevant information to be not displayed on a public display page; and not sending the relevant information to the target device.

The first setting operation, the second setting operation, and the third setting operation are described above in connection with FIG. 2.

In the third setting operation, if the relevant information is set to be not displayed on the public display page, there is no need to save the relevant information. Therefore, when it is set not to display the relevant information on the public display page, it is also set not to send the relevant information to the target device.

In the above methods illustrated in FIGS. 1-3, after the relevant information is displayed on the target page, a third-party user may perform operations such as like, comment, and reply on the relevant information. A poster of the relevant information may also perform operations such as like, comment, and reply on the relevant information.

In addition, upper and lower limits may be set for the red packet amount in the electrical red packet according to actual application scenarios. The number of pieces of information that can be displayed on the target page at a time may be set according to a screen size of each terminal.

The timing of displaying the relevant information of the electrical red packet on the target page may be set according to an actual situation. For example, the sender or recipient may actively operate to manually post the relevant information to the target page. The relevant information may also be automatically sent by a server or a terminal. For example, when the operation of the sender sending the electrical red packet is acquired, the relevant information of the electrical red packet is automatically displayed on the target page. Similarly, as for the recipient, when the server or terminal acquires the operation of the recipient opening and accepting the electrical red packet, the relevant information of the electrical red packet is automatically displayed on the target page.

Figure 4:
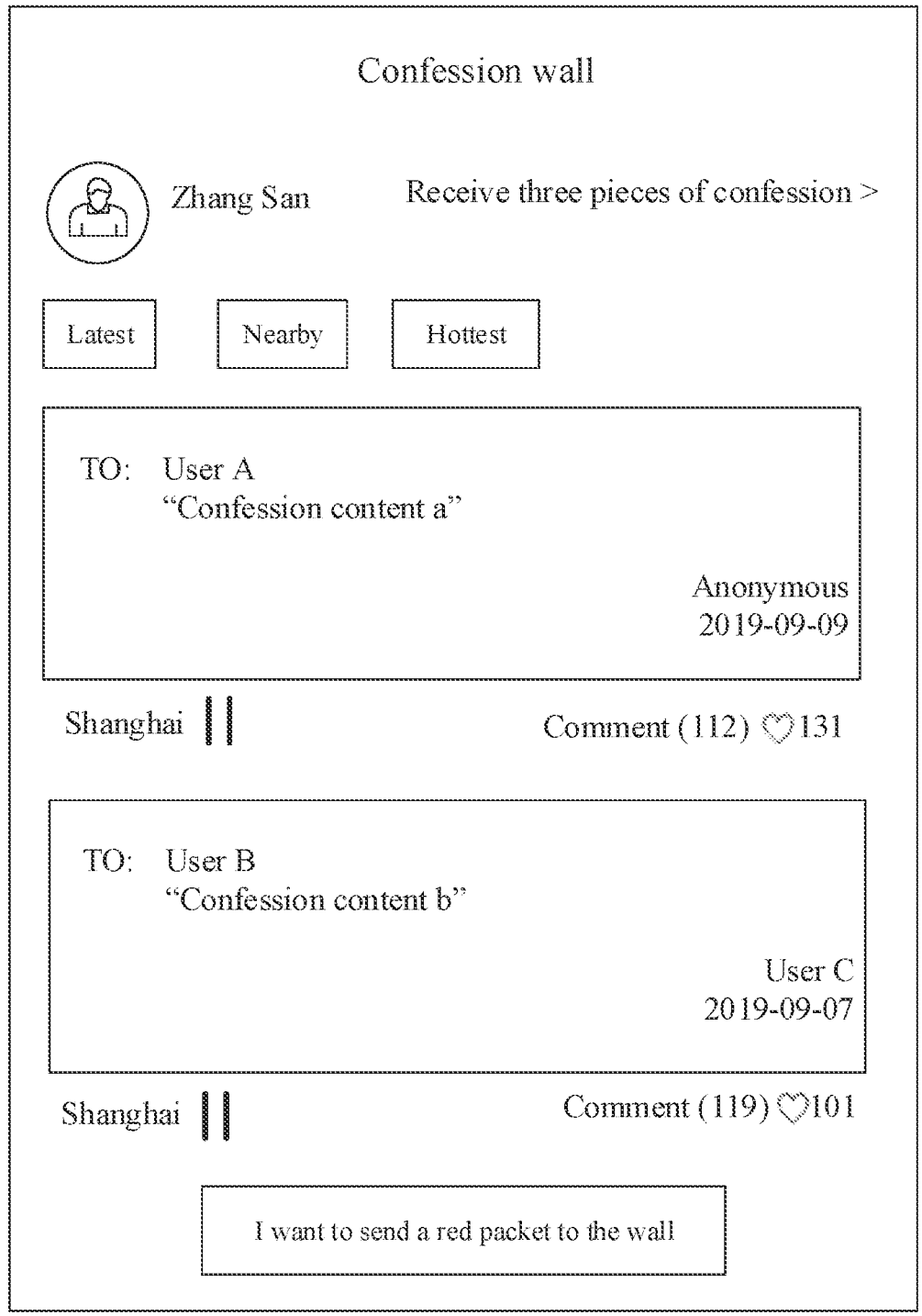
FIG. 4 is a schematic diagram of a display interface of a target page in a method for displaying relevant information of an electrical red packet according to an embodiment.

FIG. 4 is a schematic diagram of a display interface of a target page in a method for displaying relevant information of an electrical red packet, such as the method illustrated in FIG. 1, according to an embodiment.

As shown in FIG. 4, taking an application scenario of sending a confession red packet as an example, a target page may be a confession wall. On the confession wall, there are buttons for selecting "Latest," "Nearby," and "Hottest." When browsing the target page, a user may click a corresponding button according to actual needs, for example, when the user clicks the "Latest" button, the target page will display relevant information for the user according to generation time of the relevant information. As shown in FIG. 4, the confession red packet sent by an anonymous user to user A was posted on Sep. 9, 2019; the confession red packet sent by user C to user B was posted on Sep. 7, 2019; and in an inverse chronological order, information latest in time is displayed on top. In addition, "Zhang San" who is browsing the confession wall may click the button "I want to send a red packet to the wall" to post relevant information of his/her electrical red packet to the confession wall.

By means of the display interface in FIG. 4, the relevant information of an electrical red packet of each user may be displayed on the confession wall for third-party users to browse.

FIG. 5 is a schematic diagram of an interface of a sending page in a method for sending relevant information of an electrical red packet, such as the method illustrated in FIG. 2, according to an embodiment.

As shown in FIG. 5, a sender of the electrical red packet may select a sending object of the electrical red packet on the sending page. For example, a friend may be selected from a friend list. A confession content may also be entered. The confession content may be a paragraph of text, voice, or the like. Information entering of the sending interface for the electrical red packet may be completed by entering the red packet amount, finally choosing whether to send it anonymously, and clicking "stuff in the red packet."

Regarding the method in the above embodiment 3, after the electrical red packet is sent to the recipient, it will be displayed on a conversation interface of the recipient, and the recipient may open the red packet by clicking the red packet. The specific process may be described with reference to FIG. 6.

Figure 6:
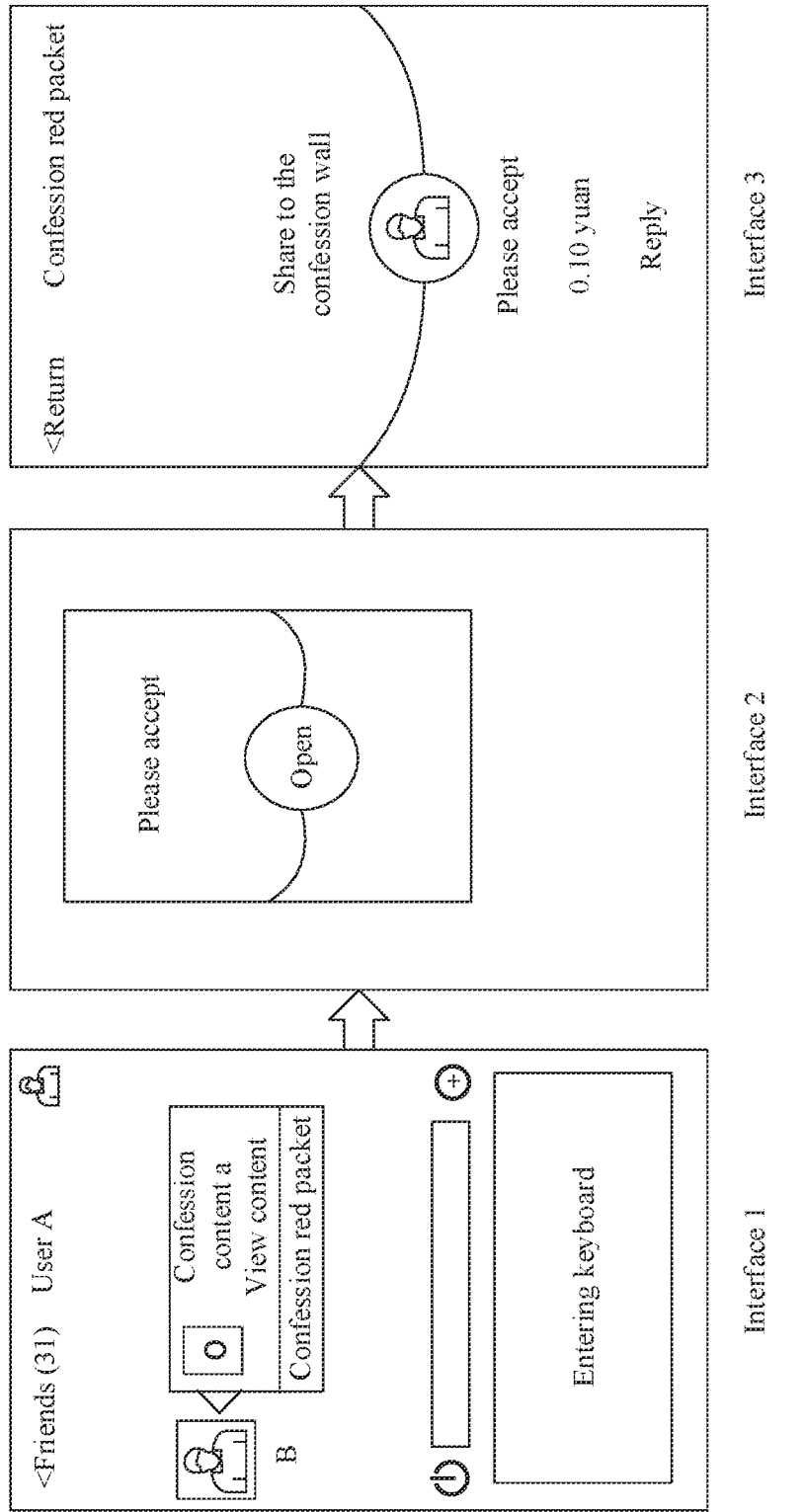
FIG. 6 is a schematic diagram of an interface of a receiving interface in a method for receiving relevant information of an electrical red packet according to an embodiment.

FIG. 6 is a schematic diagram of an interface of a receiving interface in a method for receiving relevant information of an electrical red packet, such as the method illustrated in FIG. 3, according to an embodiment. After the electrical red packet is sent to the recipient, it may be displayed on a conversation interface of the recipient, and the recipient may open the red packet by clicking the red packet.

As shown in FIG. 6, user B sends a confession red packet to user A. The confession red packet appears in a conversation interface (Interface 1) between user A and user B in the form of a conversation. Part or all of confession content a will be displayed on the confession red packet, and user A may click "View content" to view the complete confession content. After receiving the red packet, user A clicks on the confession red packet on the conversation interface (Interface 1), and it will be redirected to Interface 2. The user clicks "Open" on Interface 2, the red packet may be open, and an interface of the opened red packet is Interface 3. The red packet amount will be displayed on Interface 3. After user A opens the red packet, the red packet amount will be credited to the account immediately. User A may enter content information expected to reply to user B on interface 3. By clicking "Share to the confession wall," the confession wall may be redirected to, for sharing the relevant information of the electrical red packet.

Figure 7:
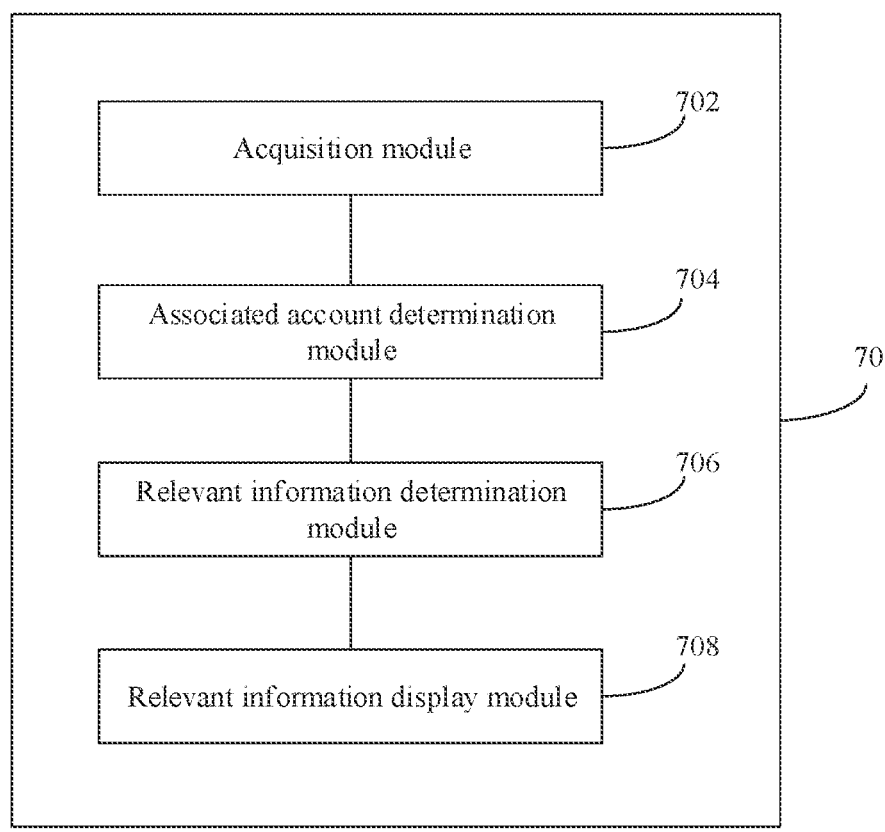
FIG. 7 is a schematic diagram of an apparatus for displaying relevant information of an electrical red packet according to an embodiment.

FIG. 7 is a schematic diagram of an apparatus 70 for displaying relevant information of an electrical red packet according to an embodiment. As shown in FIG. 7, the apparatus 70 may include: an acquisition module 702 configured to acquire a browsing operation of a user on a target page; an associated account determination module 704 configured to determine, in response to the browsing operation, at least one associated account of an account of the user; a relevant information determination module 706 configured to search for relevant information of an electrical red packet that the at least one associated account participated in before a triggering time point of the browsing operation; and a relevant information display module 708 configured to display the relevant information on the target page.

In an embodiment, the acquisition module 702 may be further configured to: acquire a click operation of the user on a redirection link on a non-target page, where a link destination address of the redirection link is the target page; or acquire a refreshing operation of the user on the target page.

In an embodiment, the associated account determination module 704 may be further configured to: determine, from accounts other than the account of the user, an account that has a friend relationship with the account of the user; or determine an account set as a following relationship in a relationship list of the account of the user.

In an embodiment, the relevant information determination module 706 may be further configured to: search for relevant information of an electrical red packet that the associated account participated in as a sender before a triggering time point of the browsing operation; or search for relevant information of an electrical red packet that the associated account participated in as a recipient before a triggering time point of the browsing operation; or search for relevant information of an electrical red packet that the associated account participated in as a sender before a triggering time point of the browsing operation and search for relevant information of an electrical red packet that the associated account participated in as a recipient before the triggering time point of the browsing operation.

In an embodiment, the relevant information display module 708 may include: a generation time determination unit configured to determine generation time of the relevant information; and a display unit configured to display the relevant information on the target page in an inverse chronological order of the generation time.

In an embodiment, the relevant information may include multimedia information entered by the sender of the electrical red packet on a sending interface of the electrical red packet when sending the electrical red packet, where the multimedia information may specifically include: one or more of text information, picture information, audio information, and video information.

In an embodiment, the apparatus 70 may further include: a setting information acquisition module configured to acquire, for one piece of relevant information, setting information of the one piece of relevant information for an associated account corresponding to the one piece of relevant information, where the setting information is used to indicate an account allowed to view the one piece of relevant information; and a first judging module configured to judge if the account of the user is an account allowed to view the one piece of relevant information to obtain a first judgment result. The relevant information display module 708 may include: a display unit configured to display the one piece of relevant information on the target page if the first judgment result indicates that the account of the user is the account allowed to view the one piece of relevant information.

In an embodiment, the relevant information display module 708 may not display the one piece of relevant information on the target page if the first judgment result indicates that the account of the user is not the account allowed to view the one piece of relevant information.

Figure 8:
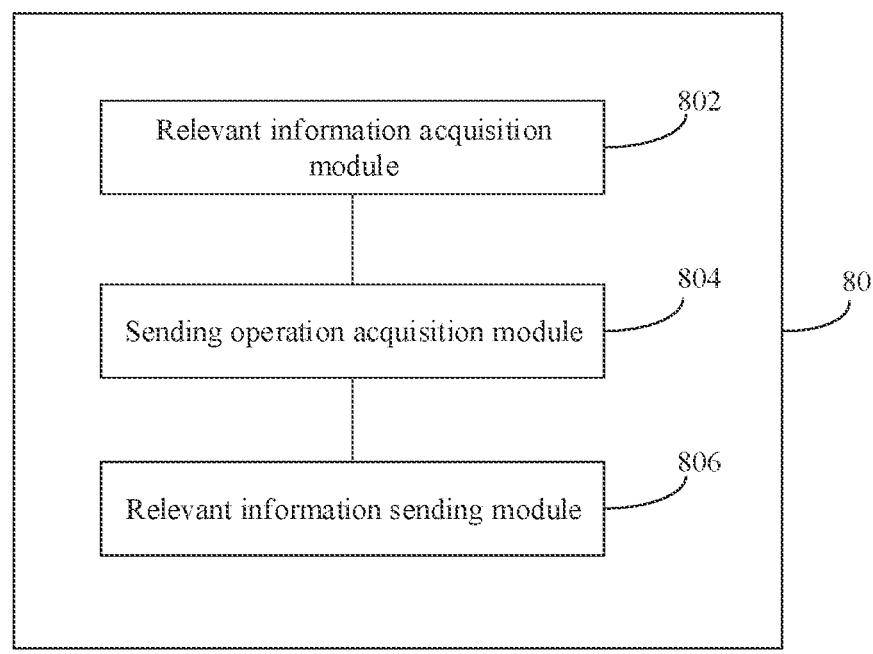
FIG. 8 is a schematic diagram of an apparatus for sending relevant information of an electrical red packet according to an embodiment.

FIG. 8 is a schematic diagram of an apparatus 80 for sending relevant information of an electrical red packet according to an embodiment. As shown in FIG. 8, apparatus 80 may include: a relevant information acquisition module 802 configured to acquire, by a terminal, relevant information entered by a user on a sending interface of an electrical red packet; a sending operation acquisition module 804 configured to acquire a sending operation on the electrical red packet; and a relevant information sending module 806 configured to send the relevant information to a target device based on the sending operation, where the relevant information stored on the target device can be displayed by the method described above in connection with FIG. 1.

In an embodiment, the relevant information acquisition module 802 may include: a multimedia information acquisition unit configured to acquire multimedia information entered by the user on the sending interface of the electrical red packet, where the multimedia information includes one or more of text information, picture information, audio information, and video information.

In an embodiment, the apparatus 80 may further include: a first setting operation acquisition module configured to acquire a first setting operation by the user on the relevant information, where the first setting operation is used to set an account allowed to view the relevant information, or the setting operation is used to set an account not allowed to view the relevant information.

In an embodiment, the first setting operation acquisition unit may be configured to: acquire a selection operation of the user on an associated user of the user.

In an embodiment, the apparatus 80 may further be configured to: display prompt information if the relevant information entered by the user on the sending interface of the electrical red packet is empty, where the prompt information is used to prompt the user to enter information on the sending interface.

In an embodiment, the apparatus 80 may further be configured to: acquire a second setting operation of the user on the relevant information, where the second setting operation is used to set the relevant information to be displayed on a public display page.

In an embodiment, the apparatus 80 may further be configured to: acquire a third setting operation of the user on the relevant information, where the third setting operation is used to set the relevant information to be anonymously displayed on a public display page.

Figure 9:
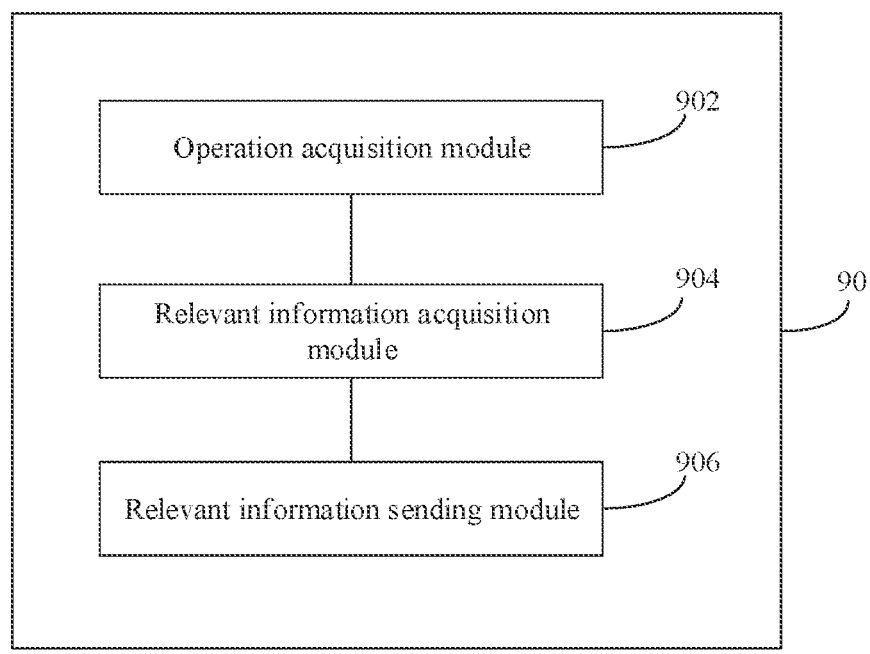
FIG. 9 is a schematic diagram of an apparatus for receiving relevant information of an electrical red packet according to an embodiment.

FIG. 9 is a schematic diagram of an apparatus 90 for receiving relevant information of an electrical red packet according to an embodiment. As shown in FIG. 9, the apparatus 90 may include: an operation acquisition module 902 configured to acquire, by a terminal, an opening operation entered by a user on a receiving interface of an electrical red packet; a relevant information acquisition module 904 configured to acquire relevant information of the electrical red packet; and a relevant information sending module 906 configured to send the relevant information to a target device, where the relevant information stored on the target device can be displayed by the method described above in connection with FIG. 1.

In an embodiment, the relevant information is multimedia information, and the multimedia information includes one or more of text information and picture information.

In an embodiment, the apparatus 90 may further include: a first setting operation acquisition module configured to acquire a first setting operation by the user on the relevant information, where the first setting operation is used to set an account allowed to view the relevant information, or the setting operation is used to set an account not allowed to view the relevant information.

In an embodiment, the apparatus 90 may further include: a second setting operation acquisition module configured to acquire a second setting operation of the user on the relevant information, where the second setting operation is used to set the relevant information to be displayed on a public display page.

In an embodiment, the apparatus 90 may further include: a third setting operation acquisition module configured to acquire a third setting operation of the user on the relevant information, where the third setting operation is used to set the relevant information to be not displayed on a public display page; and not send the relevant information to the target device.

Figure 10:
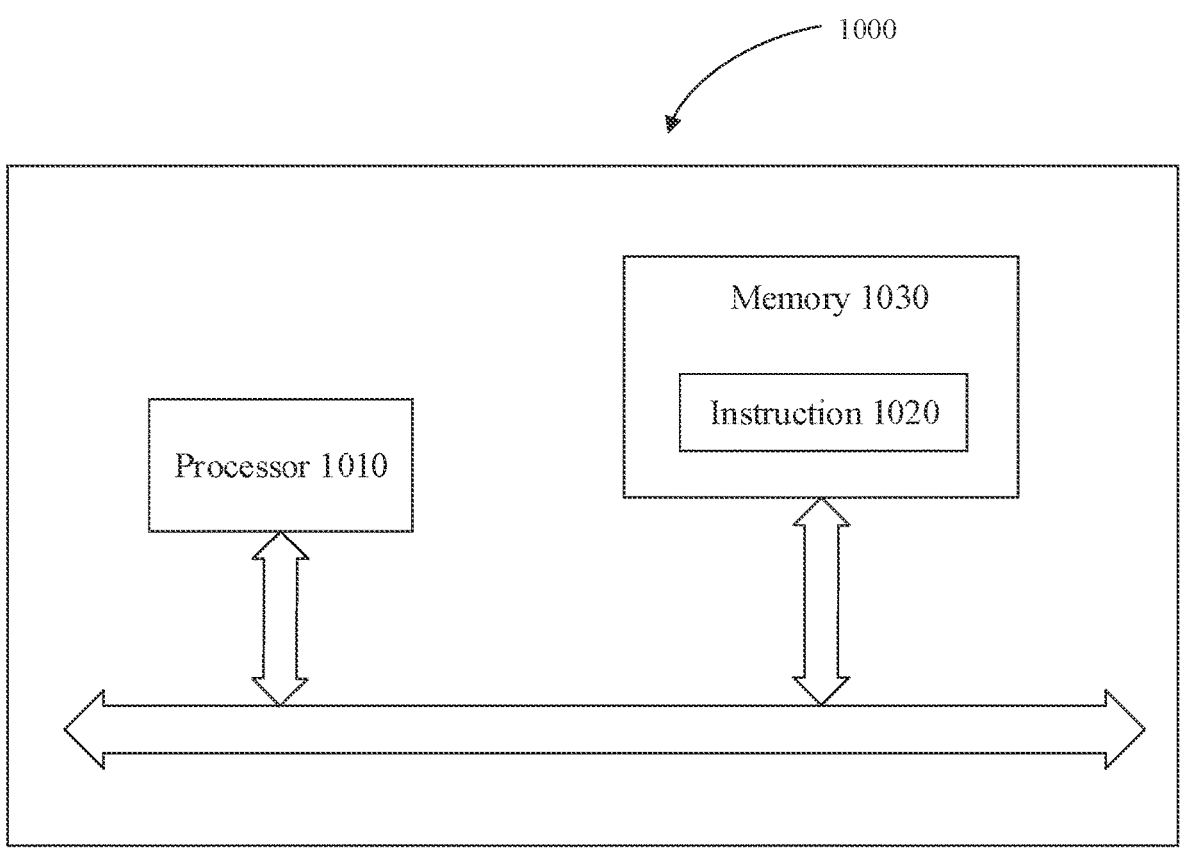
FIG. 10 is a schematic diagram of a device for displaying relevant information of an electrical red packet according to an embodiment.

FIG. 10 is a schematic diagram of a device 1000 for displaying relevant information of an electrical red packet according to an embodiment. As shown in FIG. 10, the device 1000 may include: at least one processor 1010; and memory 1030 connected in communication with the at least one processor 1010. The memory 1030 stores instructions 1020 executable by the at least one processor 1010.

In an embodiment, the at least one processor 1010 is configured to: acquire a browsing operation of a user on a target page; determine, in response to the browsing operation, at least one associated account of an account of the user; search for relevant information of an electrical red packet that the at least one associated account participated in before a triggering time point of the browsing operation; and display the relevant information on the target page.

In an embodiment, the at least one processor 1010 is configured to: acquire, by a terminal, relevant information entered by a user on a sending interface of an electrical red packet; acquire a sending operation on the electrical red packet; and send the relevant information to a target device based on the sending operation, where the relevant information stored on the target device can be displayed by the method described above in connection with FIG. 1.

In an embodiment, the at least one processor 1010 is configured to: acquire, by a terminal, an opening operation entered by a user on a receiving interface of an electrical red packet; acquire relevant information of the electrical red packet; and send the relevant information to a target device, where the relevant information stored on the target device can be displayed by the method described above in connection with FIG. 1.

A non-transitory computer-readable medium is further provided in embodiments of the present specification. The computer-readable medium stores computer-readable instructions thereon, where the computer-readable instructions can be executed by a processor to perform: acquiring a browsing operation of a user on a target page; determining, in response to the browsing operation, at least one associated account of an account of the user; searching for relevant information of an electrical red packet that the at least one associated account participated in before a triggering time point of the browsing operation; and displaying the relevant information on the target page.

A non-transitory computer-readable medium is further provided in embodiments of the present specification. The computer-readable medium stores computer-readable instructions thereon, where the computer-readable instructions can be executed by a processor to perform: acquiring, by a terminal, relevant information entered by a user on a sending interface of an electrical red packet; acquiring a sending operation on the electrical red packet; and sending the relevant information to a target device based on the sending operation, where the relevant information stored on the target device can be displayed by the method described above in connection with FIG. 1.

A non-transitory computer-readable medium is further provided in embodiments of the present specification. The computer-readable medium stores computer-readable instructions thereon, where the computer-readable instructions can be executed by a processor to perform: acquiring, by a terminal, an opening operation entered by a user on a receiving interface of an electrical red packet; acquiring relevant information of the electrical red packet; and sending the relevant information to a target device, wherein the relevant information stored on the target device can be displayed by the method described above in connection with FIG. 1.

With the development of technologies, nowadays, the improvement to many method flows can be implemented as a direct improvement to a hardware circuit structure. Designers program improved method flows into hardware circuits to acquire corresponding hardware circuit structures. For example, a Programmable Logic Device (PLD) (e.g., a Field Programmable Gate Array (FPGA)) is such an integrated circuit, of which the logic function is determined by a user through programming the device. Designers "integrate" a digital symbol system onto a piece of PLD by independent programming without asking a chip manufacturer to design and manufacture a dedicated integrated circuit chip. Moreover, at present, instead of manually making an integrated circuit chip, this programming is also implemented mostly using "logic compiler" software, which is similar to a software compiler used for program development and compilation. However, the original code before compilation also has to be compiled using a specific programming language, which is known as a Hardware Description Language (HDL). There is not only one, but many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are the most commonly used. Those skilled in the art should also know that a hardware circuit for implementing a logic method flow can be easily acquired by slightly logically programming the method flow using the above several hardware description languages and programming it into an integrated circuit.

In some embodiments, a controller may be used to implement the above methods. For example, the controller may be in the form of a microprocessor or processor and a computer-readable medium storing computer-readable program code (such as software or firmware) executable by this (micro)processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A controller of a memory may also be implemented as part of the control logic of the memory. Those skilled in the art also know that, in addition to implementing a controller in the form of pure computer-readable program code, the method steps can be logically programmed to enable the controller to realize the same function in the form of logic gates, switches, special integrated circuits, programmable logic controllers, embedded microcontrollers, or the like.

The systems, apparatuses, modules, or devices in the above embodiments may be implemented by a computer chip or entity, or by a product with a certain function. An example implementation device is a computer. For example, the computer may be a personal computer, a laptop computer, a cell phone, a camera phone, a smart phone, a personal digital assistant, a media player, a navigation device, an e-mail device, a game console, a tablet computer, a wearable device, or a combination of any of these devices.

The embodiments are described with reference to flowcharts and/or block diagrams. It should be understood that each flow and/or block in the flowcharts and/or block diagrams and a combination of flows and/or blocks in the flowcharts and/or block diagrams may be implemented by computer program instructions. These computer program instructions can be provided to a processor of a general-purpose computer, a special-purpose computer, an embedded processor, or another programmable data processing device to produce a machine, so that the instructions executed by the processor of the computer or another programmable data processing device produce an apparatus for realizing the functions specified in one or more flows of the flowcharts and/or one or more blocks of the block diagrams.

These computer program instructions may also be stored in a computer-readable medium that can direct a computer or another programmable data processing device to work in a specific manner, so that the instructions stored in this computer-readable medium produce an article of manufacture including an instruction apparatus which implements the functions specified in one or more flows of the flowcharts and/or one or more blocks of the block diagrams.

These computer program instructions can also be loaded onto a computer or another programmable data processing device, so that a series of operation steps are performed on the computer or another programmable device to produce computer-implemented processing, so that the instructions executed on the computer or another programmable device provide steps for implementing the functions specified in one or more flows of the flowcharts and/or one or more blocks of the block diagrams.

The computer-readable medium includes permanent and non-permanent, removable and non-removable media, and can store information by any method or technology. The information may be computer-readable instructions, data structures, program modules, or other data. Examples of computer storage media include, but are not limited to, a phase change memory (PRAM), a static random access memory (SRAM), a dynamic random access memory (DRAM), other types of random access memories (RAM), read-only memories (ROM), electrically erasable programmable read-only memories (EEPROM), flash memories or other memory technologies, read-only compact disc read-only memories (CD-ROM), digital versatile disks (DVD) or other optical storage, magnetic tape cassettes, magnetic tape magnetic disk storage or other magnetic storage devices, or any other non-transmission media, and the computer storage media can be used to store information that can be accessed by computing devices. As defined herein, the computer-readable medium does not include temporary computer-readable media (transitory media), such as a modulated data signal and a carrier.

One or more embodiments of the present specification may be implemented using computer-executable instructions executed by a computer, such as a program module. Generally, the program module includes a routine, a program, an object, an assembly, a data structure, and the like used for executing a specific task or implementing a specific abstract data type. The present application may also be practiced in distributed computing environments. In the distributed computing environments, tasks are executed by remote processing devices that are linked through a communication network. In the distributed computing environments, the program module may be located in local and remote computer storage media including a storage device.

The foregoing description is merely example embodiments of the present specification, and is not used to limit the present specification. For those skilled in the art, the present specification can have various alterations and changes. Any modifications, equivalent replacements, improvements, etc. made within the spirit and principle of the present specification shall be included in the scope of the claims.

The invention claimed is:

1. A method for displaying information of an electrical red packet, comprising:
acquiring a browsing operation of a user on a target page, wherein the user is not a sender or receiver of the electrical red packet, and the acquiring comprises acquiring a refreshing operation of the user that is not the sender or receiver of the electrical red packet on the target page;
determining, in response to the browsing operation of the user that is not the sender or receiver of the electrical red packet, an associated account of an account of the user;
searching for information of the electrical red packet that the associated account participated in before a triggering time point of the browsing operation;
acquiring a setting of the information for the associated account corresponding to the information, wherein the setting indicates an account allowed to view the information;
judging whether the account of the user is an account allowed to view the information to obtain a first judgment result; and
displaying the information on the target page when the first judgment result indicates that the account of the user is the account allowed to view the information,
wherein the refreshing operation comprises a pull-down operation, and the displaying comprises prioritizing display of popular information obtained from the refreshing operation.

2. The method according to claim 1, wherein the acquiring the browsing operation of the user on the target page further comprises:
acquiring a click operation of the user on a redirection link on a non-target page, wherein a link destination address of the redirection link is the target page.

3. The method according to claim 1, wherein the determining the associated account of the account of the user comprises one of:
determining, from accounts other than the account of the user, an account that has a friend relationship with the account of the user; or
determining an account set as a following relationship in a relationship list of the account of the user.

4. The method according to claim 1, wherein the searching for information of the electrical red packet that the associated account participated in before the triggering time point of the browsing operation comprises at least one of:

searching for information of the electrical red packet that the associated account participated in as a sender before the triggering time point of the browsing operation; or searching for information of the electrical red packet that the associated account participated in as a recipient before the triggering time point of the browsing operation.

5. The method according to claim 1, wherein the displaying the information on the target page comprises:
determining generation time of the information; and
displaying the information on the target page in an inverse chronological order of the generation time.

6. The method according to claim 1, wherein the information comprises:
multimedia information entered by a sender of the electrical red packet on a sending interface of the electrical red packet when sending the electrical red packet,
wherein the multimedia information comprises one or more of text information, picture information, audio information, and video information.

7. The method according to claim 1, further comprising:
not displaying the information on the target page when the first judgment result indicates that the account of the user is not the account allowed to view the information.

8. A method for sending information of an electrical red packet, comprising:
acquiring, by a terminal, information entered by a user on a sending interface of an electrical red packet;
acquiring a sending operation on the electrical red packet; and
sending the information to a target device based on the sending operation,
wherein the information is stored on the target device and displayed by the method according to claim 1.

9. The method according to claim 8, wherein the acquiring information entered by the user on the sending interface of the electrical red packet comprises:
acquiring multimedia information entered by the user on the sending interface of the electrical red packet, wherein the multimedia information comprises one or more of text information, picture information, audio information, and video information.

10. The method according to claim 8, before the sending the information to the target device, further comprising:
acquiring a first setting operation by the user on the information, wherein the first setting operation sets an account allowed to view the information, or sets an account not allowed to view the information.

11. The method according to claim 10, wherein the acquiring the first setting operation by the user on the information comprises:
acquiring a selection operation of the user on an associated user of the user.

12. The method according to claim 8, after the acquiring the sending operation on the electrical red packet, further comprising:
displaying prompt information when the information entered by the user on the sending interface of the electrical red packet is empty, wherein the prompt information prompts the user to enter information on the sending interface.

13. The method according to claim 8, before the sending the information to a target device, further comprising:
acquiring a second setting operation of the user on the information, wherein the second setting operation sets the information to be displayed on a public display page.

14. The method according to claim 8, before the sending the information to the target device, further comprising:
acquiring a third setting operation of the user on the information, wherein the third setting operation sets the information to be anonymously displayed on a public display page.

15. A method for receiving information of an electrical red packet, comprising:
acquiring, by a terminal, an opening operation entered by a user on a receiving interface of an electrical red packet;
acquiring information of the electrical red packet; and
sending the information to a target device, wherein the information is stored on the target device and displayed by the method according to claim 1.

16. The method according to claim 15, wherein the information is multimedia information, and the multimedia information comprises one or more of text information and picture information.

17. The method according to claim 15, before the sending the information to the target device, further comprising:
acquiring a first setting operation by the user on the information, wherein the first setting operation sets an account allowed to view the information, or sets an account not allowed to view the information.

18. The method according to claim 15, before the sending the information to the target device, further comprising:
acquiring a second setting operation of the user on the information, wherein the second setting operation sets the information to be displayed on a public display page.

19. The method according to claim 15, further comprising:
acquiring a third setting operation of the user on the information, wherein the third setting operation sets the information to be not displayed on a public display page; and
not sending the information to the target device.

* * * * *